US012687559B2

(12) United States Patent　(10) Patent No.:　US 12,687,559 B2
Wohlfart et al.　(45) Date of Patent:　Jul. 21, 2026

(54) OPTICAL GATE AND METHOD FOR DETERMINING A VELOCITY VECTOR OF A SPHERICAL PROJECTILE

(71) Applicants:Budapesti Müszaki és Gazdaságtudományi Egyetem (Budapest University of Technology and Economics), Budapest (HU); TÁMOGATOTT KUTATÓCSOPORTOK IRODÁJA, Budapest (HU)

(72) Inventors: Richárd Wohlfart, Budapest (HU); Bálint Magyar, Budajenö (HU); Ákos Miklós, Sopron (HU); Dénes Takács, Gödöllö (HU); Gábor Stépán, Budapest (HU)

(73) Assignees: BUDAPESTI MUSZAKI ÉS GAZDASÁGTUDOMÁNYI EGYETEM (Budapest University of Technology and Economics), Budapest (HU); TÁMOGATOTT KUTATÓCSOPORTOK IRODÁJA, Budapest (HU)

( * ) Notice: Subject to any disclaimer, the term of this patent is extended or adjusted under 35 U.S.C. 154(b) by 446 days.

(21) Appl. No.: 18/571,979

(22) PCT Filed: Jun. 27, 2022

(86) PCT No.: PCT/HU2022/050053
§ 371 (c)(1),
(2) Date: Dec. 19, 2023

(87) PCT Pub. No.: WO2023/275577
PCT Pub. Date: Jan. 5, 2023

(65) Prior Publication Data
US 2024/0288464 A1　Aug. 29, 2024

(30) Foreign Application Priority Data

Jun. 29, 2021　(HU) ...................................... 2100249

(51) Int. Cl.
*G01P 3/68*　(2006.01)
(52) U.S. Cl.
CPC ................................... *G01P 3/685* (2013.01)
(58) Field of Classification Search
CPC ........... G01P 3/685; G01P 3/40; G01D 5/342
(Continued)

(56) References Cited

U.S. PATENT DOCUMENTS 5,577,733 A　11/1996　Downing
5,988,645 A　11/1999　Downing
(Continued)

FOREIGN PATENT DOCUMENTS

HU　　P0700736　　5/2009
RU　　2661069　C1　7/2018

OTHER PUBLICATIONS

"Measurement of the modal parameters of rotating spindles by ball shooting Impact excitation" by Takács D. et al.; 8th CIRP Conference on High Performance Cutting (HPC 2018)—Takács, Dénes & Wohlfart, Richard & Miklós, Ákos & Gábor, Krajnyák & Toth, Andras & Stépán, Gábor. (2018). Ball shooting tests for identification of modal parameter variation in rotating main spindles. Procedia CIRP. 77. 481-484. 10.1016/j.procir.2018.08.260.

*Primary Examiner* — Susan E. Hodges
(74) *Attorney, Agent, or Firm* — Olson & Cepuritis, Ltd.

(57)　ABSTRACT

The invention relates to an optical gate (100) for determining a velocity vector (V) of a spherical projectile (10), which comprises a sensor array (20) defined by a row of light detecting sensors (22) arranged next to each other, and an illuminating array (30) defined by a row of point light sources (32) arranged next to each other and illuminating
(Continued)

Figure 1:
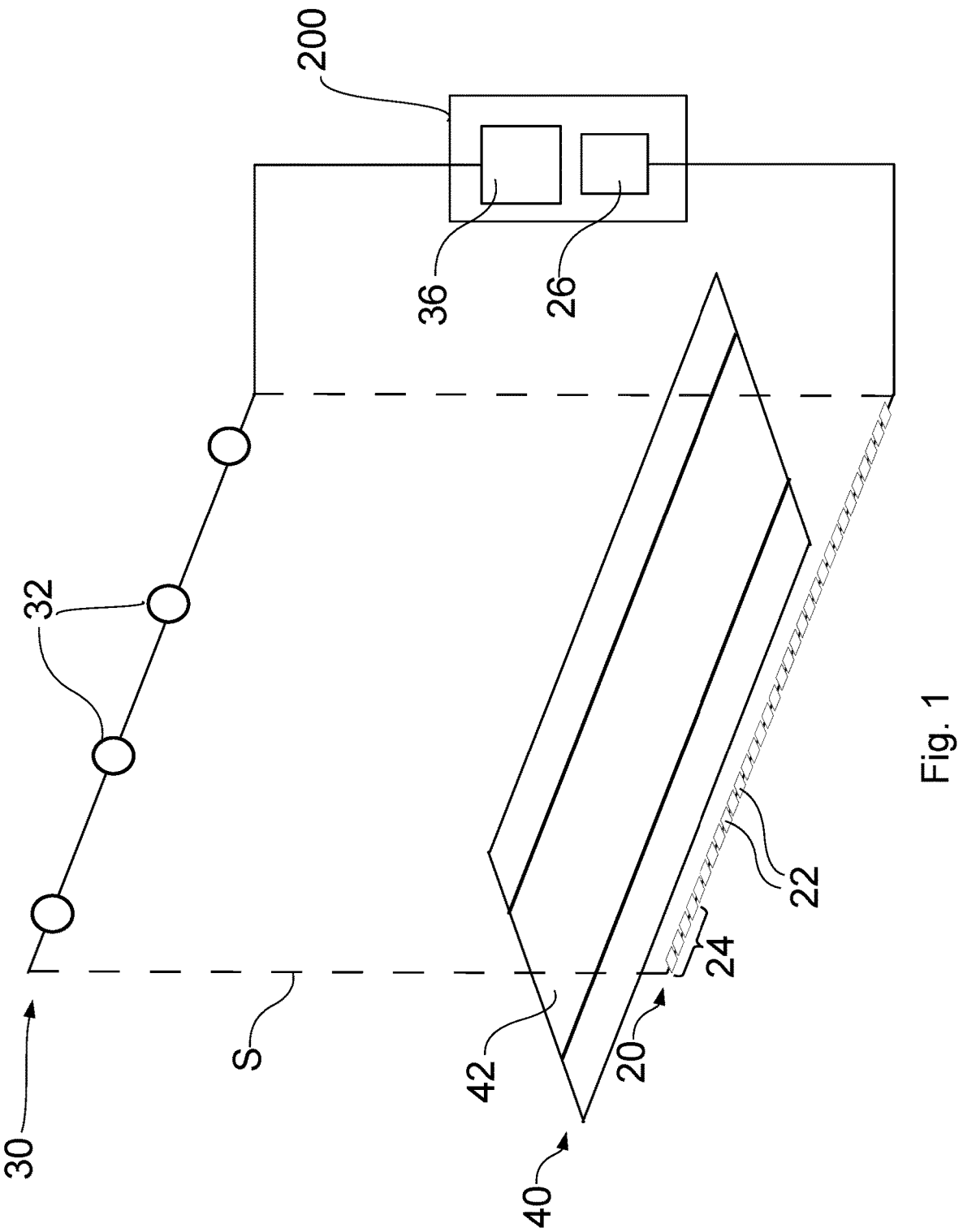

towards the sensors (22), wherein the illuminating array (30) is arranged opposite the sensor array (20). The illuminating array (30) and said sensor array (20) being arranged in a common plane (S), and an optical diffuser plate (40) being arranged between said illuminating array (30) and said sensor array (20), said light detecting sensors (22) defining a detection area (42) on said diffuser plate (40) parallel to said sensor array (20), and the optical gate (100) comprises an electronic control unit (36) configured to consecutively flash the point light sources (32) at predetermined time instants at high frequency, and an electronic measuring unit (26) for processing the signals generated by the light detecting sensors (22). The measuring unit (26) being configured to determine the brightness distribution and total brightness along the detection area (42) based on the data generated by the sensors (22) of the sensor array (20). The invention also relates to methods for determining the velocity vector (V) of a spherical projectile (10).

17 Claims, 10 Drawing Sheets

(58) Field of Classification Search
    USPC .......................................................... 356/28
    See application file for complete search history.

(56) References Cited

U.S. PATENT DOCUMENTS

| | | | | |
|---|---|---|---|---|
| 9,157,731 | B2 * | 10/2015 | Steffl | ........................ G01P 3/685 |
| 11,294,058 | B2 * | 4/2022 | Dehlinger | .............. G01S 17/86 |
| 2014/0118720 | A1 | 5/2014 | Steffl | |
| 2019/0257912 | A1 | 8/2019 | Remelius | |
| 2021/0080481 | A1 | 3/2021 | Hardy | |
| 2022/0206155 | A1 * | 6/2022 | Inada | .................... G01S 17/894 |

* cited by examiner

30

20

22

10

32d

40

30

20

22

10

32c

40

OPTICAL GATE AND METHOD FOR DETERMINING A VELOCITY VECTOR OF A SPHERICAL PROJECTILE

CROSS-REFERENCE TO RELATED APPLICATION

This application is a U.S. National Stage of PCT/HU2022/050053, filed Jun. 27, 2022, which claims priority to Hungarian Patent No. P2100249, filed Jun. 29, 2021, each of which is incorporated herein by reference.

The invention relates to an optical gate for determining the velocity vector of a spherical projectile.

The invention further relates to a method for determining the velocity vector of a spherical projectile using an optical gate according to the invention.

The invention further relates to a method for determining the velocity vector a spherical projectile, wherein at least two optical gates according to the invention arranged one after the other are provided.

The most important experimental method for determining the dynamic properties of mechanical systems is the so-called experimental modal analysis. This involves measuring the output (frequency response) of a mechanical system for a known input excitation. Such vibration analysis therefore requires an excitation device or system that generates the desired excitation.

The excitation of the system can be done in various ways, including harmonic excitation with electromagnetic or hydraulic shakers, or force impulse excitation with modal hammers (impulse hammer), etc. The disadvantage of the above-mentioned harmonic excitation is that the measurement setup is time-consuming, and sufficient space and additional components are required to connect the shaker. In the case of the modal hammer, the quality of the excitation is usually lower compared to the harmonic excitation, but this quality can be improved by repeating the hammer strokes several times and by averaging. A further disadvantage of the known solutions is that, for long measurements at many excitation points, vibration tests with shakers or hand-held impactors can be very cumbersome. A further problem in vibration testing is the need to excite components while they are moving or rotating. Firstly, connecting a shaker is very complicated and secondly, hitting such machine parts can be difficult, even dangerous. With moving parts, communicating the impulse to the desired location at the required time can be critical.

To overcome the above drawbacks, the article "Measurement of the modal parameters of rotating spindles by ball shooting Impact excitation" by Takács D. et al.; 8th CIRP Conference on High Performance Cutting (HPC 2018) proposes the use of spherical projectiles for the excitation of the mechanical system. The idea is to fire a spherical projectile at a targeted excitation point and then determine the magnitude and direction of the force impulse acting on the target. The frequency spectrum of the excitation force of the impulse excitation could in principle be calculated on this basis. Since the force impulse can be determined from the difference between the linear momentums of the projectile before and after impact near the point of excitation, it is essential to measure the projectile's spatial velocity vector accurately before and after impact.

Although modal analysis with projectile is more advantageous compared to other solutions, the main drawback is that the exact determination of the projectile velocity vector is currently not, or only to a limited extent, possible. A known solution to determine the velocity and trajectory of projectiles is to use, for example, two or more high-speed cameras, but these are expensive, mostly inaccurate and data extraction is time-consuming.

For example, patent document U.S. Pat. No. 5,988,645 discloses a moving object monitoring system. In an optical gate, an array of light sensors in one direction and an array of light sources in the same direction are spaced apart by a given distance so as to define a detection plane. The trajectory crosses the detection plane. A second, orthogonal light source-sensor pair is placed essentially in the same detection plane such that the optical paths of the first and second light source-sensor pairs form an angle (preferably a right angle) with each other. The sensors detect light from multiple light sources but are insensitive to light from orthogonal light sources. The operation of the sensors and light sources is multiplexed, with a speed such that an object passing through the planes appears to stop in one cycle. The point of intersection of a given detection plane and trajectory is determined by the position of the shadow projected on one or the other sensor array of the given detection plane by marking the intersection points of optical paths. Two such optical gates, i.e. two detection planes, are located in the system at a given distance from each other. They are optically independent from each other. The velocity vector is determined by a calculation based on the intersections of the first and second gate detection planes and the distance between the two gates. The control of the light sources, the processing of the light sensor signals and the calculations are performed by an intelligent electronic unit. Other solutions for determining the velocity of projectiles are described in patent documents US 2014/0118720, RU 2 661 069 and HU P0700736.

We recognised that there is a need for a device and method to determine the velocity and direction of a spherical projectile simply and accurately.

We also recognised that with the help of an array of illuminating point light sources arranged next to each other and with an array of sensors with several light detecting sensors arranged next to each other, wherein the illuminating array is arranged opposite the sensor array, an optical gate can be provided that can determine the position of a spherical projectile passing through the gate with high accuracy at a given time instant and in a selected plane.

We also recognised that in order to accurately determine the position of the projectile, the consecutive flashing of the point light sources with a high frequency (preferably at least 1 MHz) is necessary. As a result, shadows of the spherical projectile with different projections and well-defined contours are created along the sensor array, in time slices close to each other.

The object of the invention is to create an optical gate and measurement methods that are free from the disadvantages of state-of-the-art solutions. In particular, the invention aims to provide an optical gate that can determine the velocity vector of a spherical projectile more accurately and simply than current solutions, without requiring complex and expensive components (such as a high-speed camera), and sufficiently compact in size to be used for projectile modal analysis. It is also an object of the invention to provide methods for determining the velocity vector of a spherical projectile with high accuracy using one or more optical gates according to the invention.

According to the invention, the problem has been solved by the optical gate according to claim 1, the method according to claim 7, and the method according to claim 13.

Preferred embodiments of the invention are defined in the dependent claims.

Figures 2A, 2B, 2C:
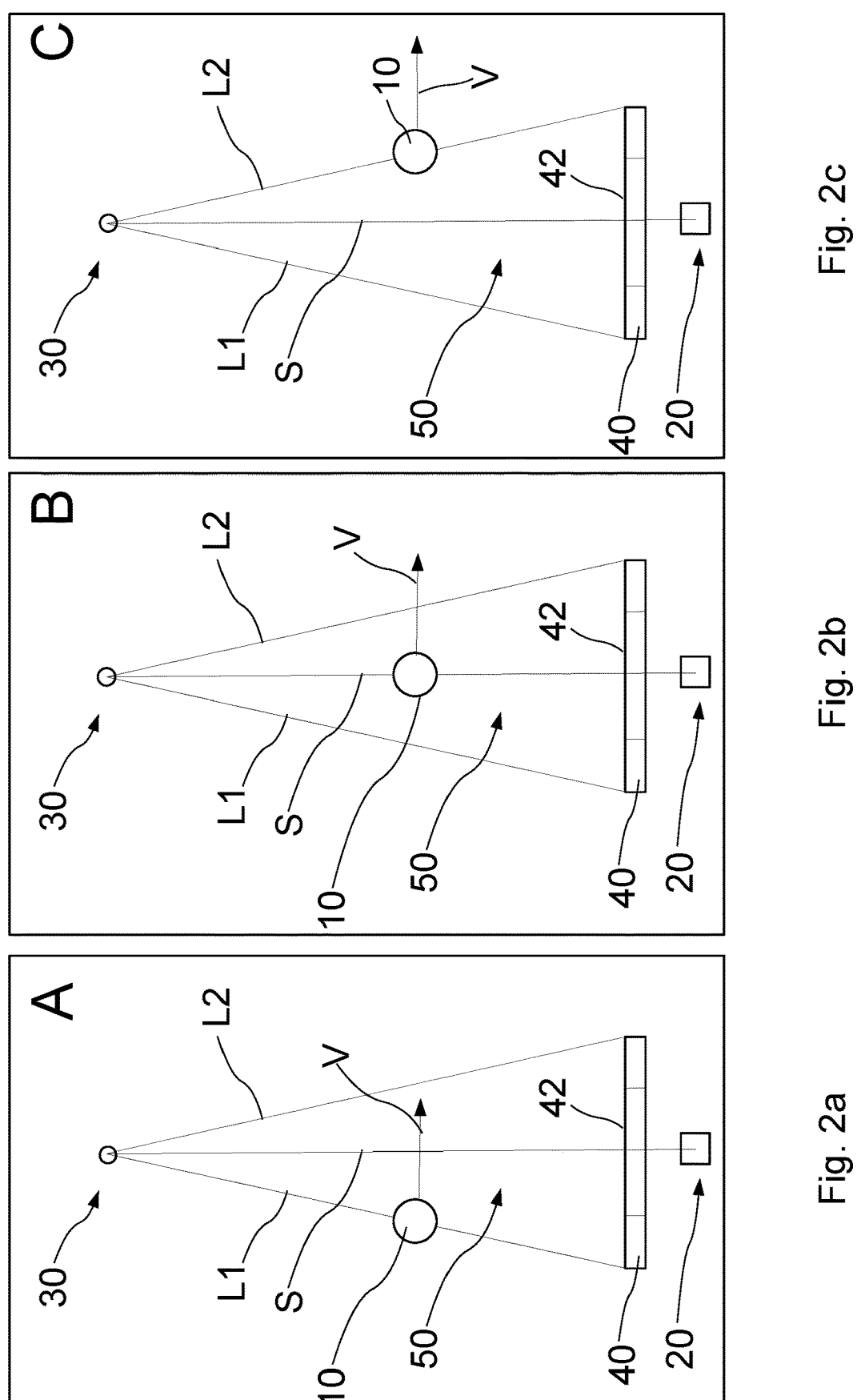
Figure 3:
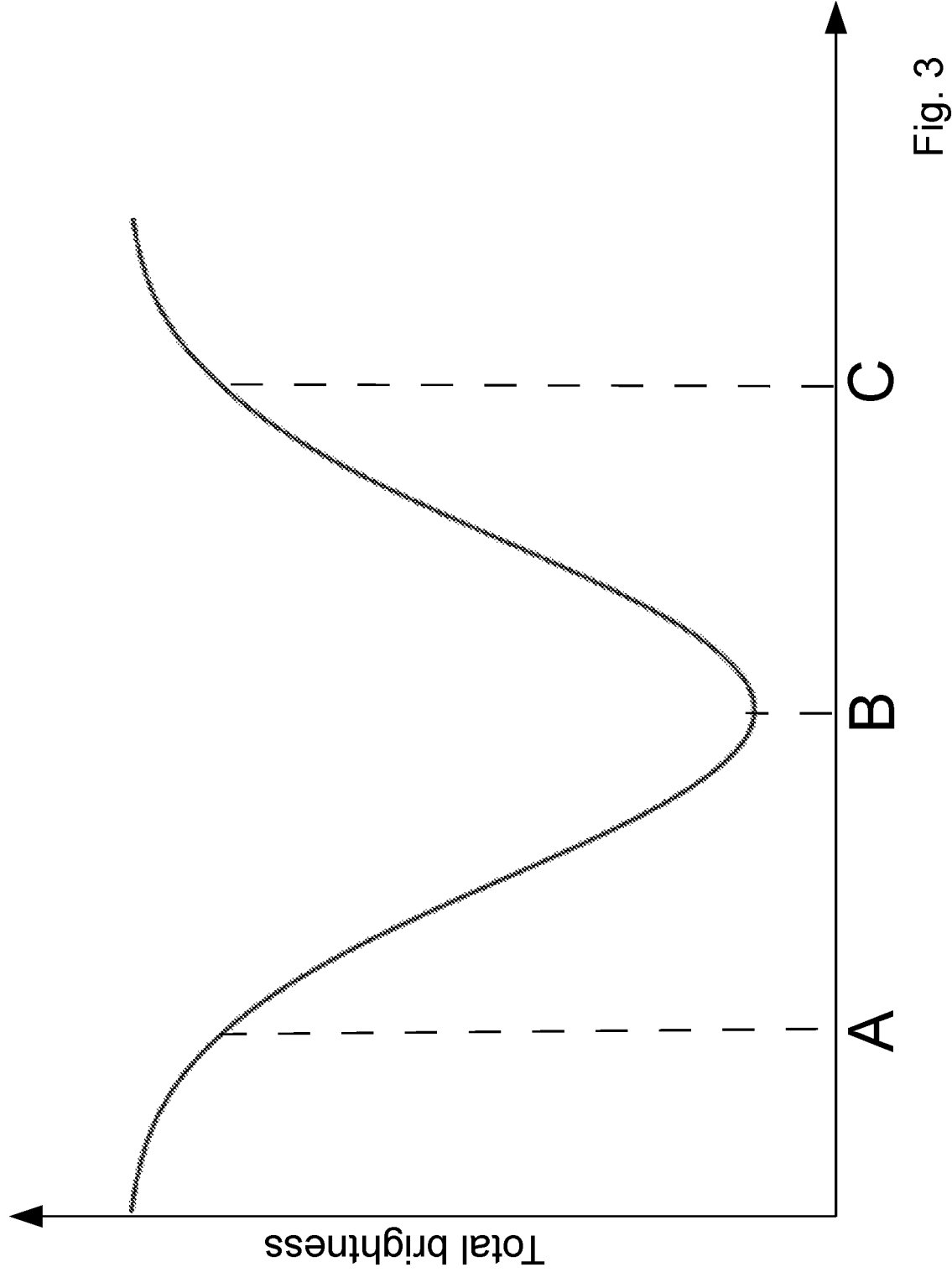
Figures 4A, 4B:
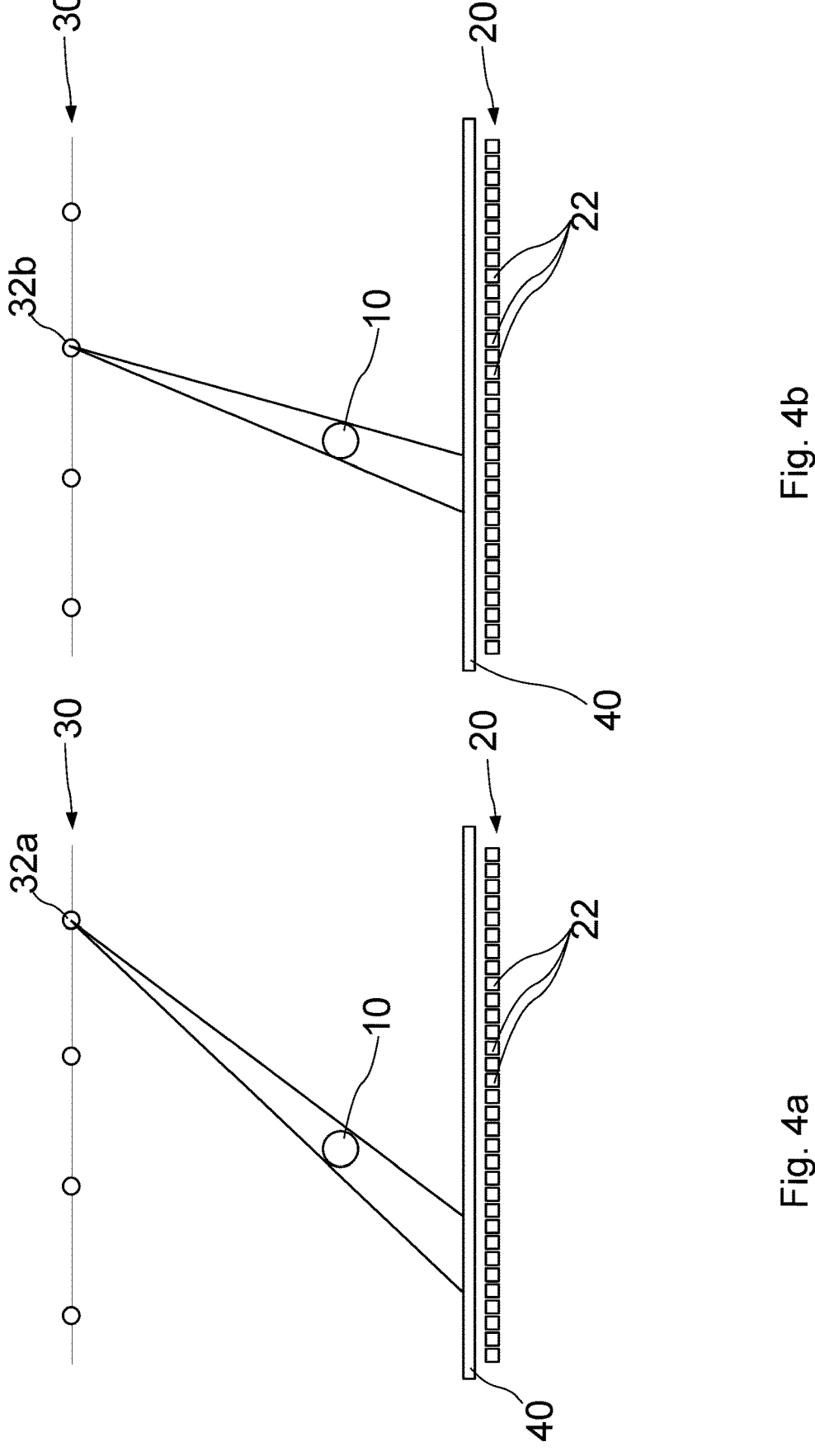
Figures 4C, 4D:
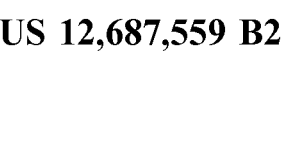
Figure 5:
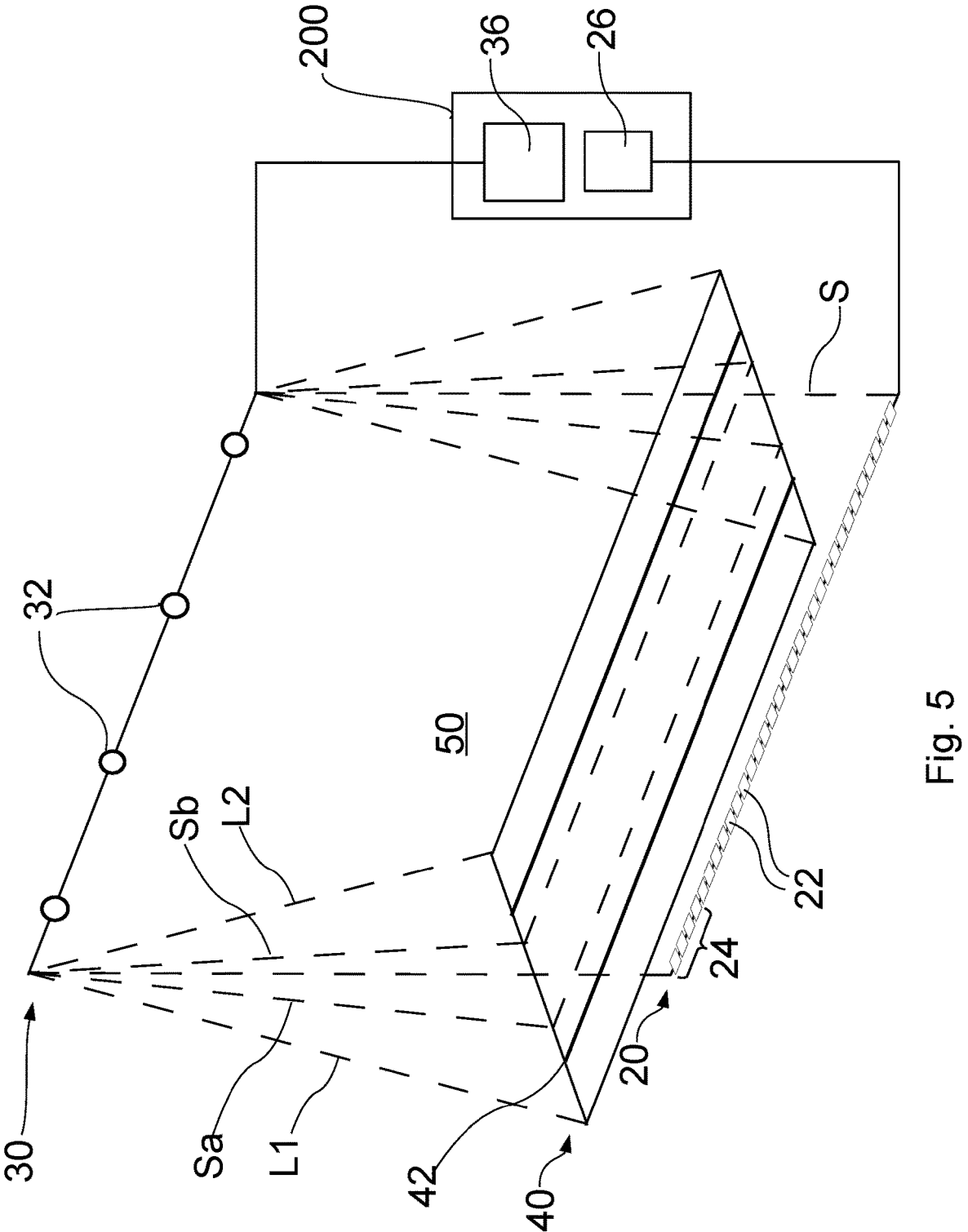
Figure 6B:
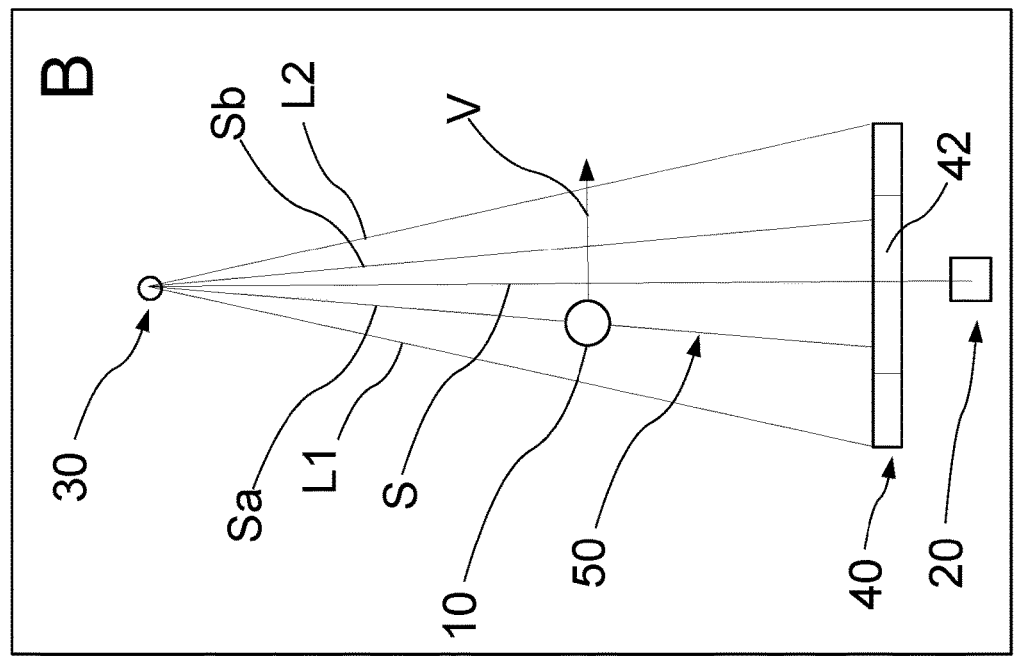
Figure 6A:
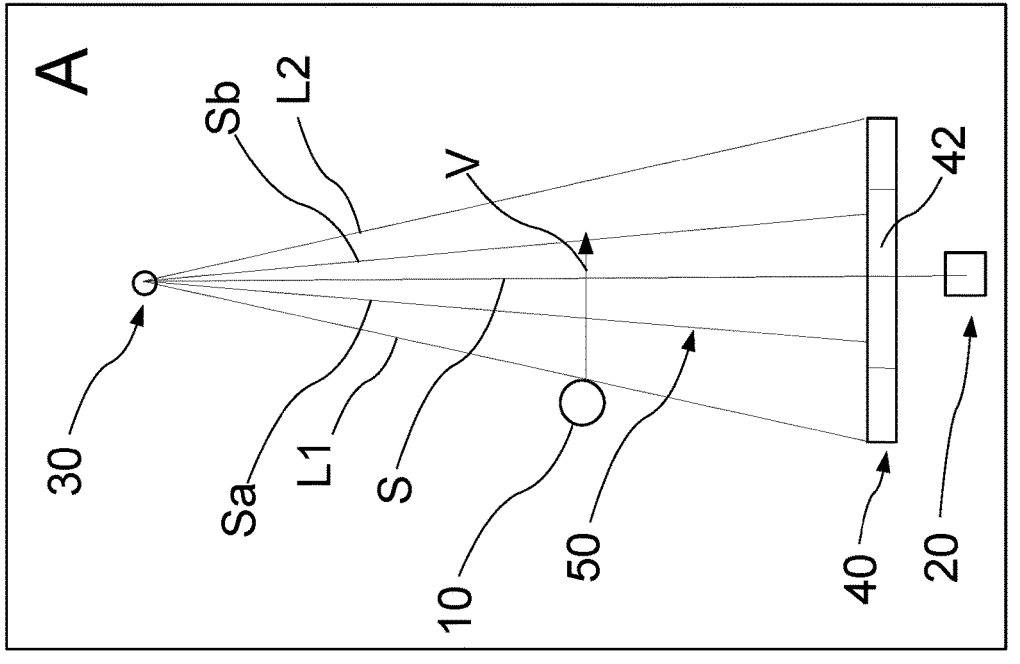
Figure 6D:
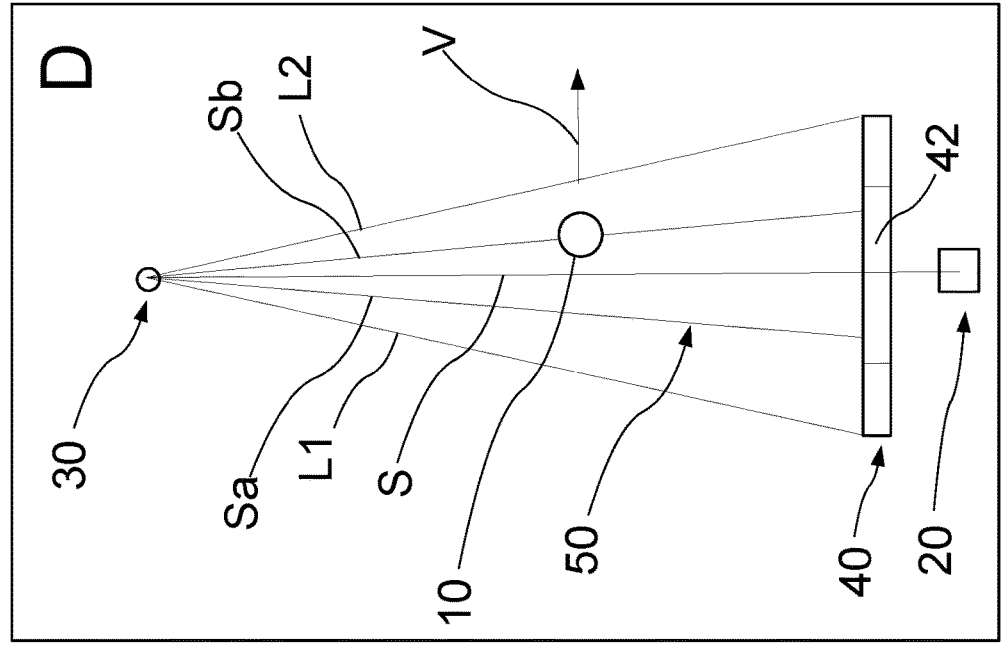
Figure 6C:
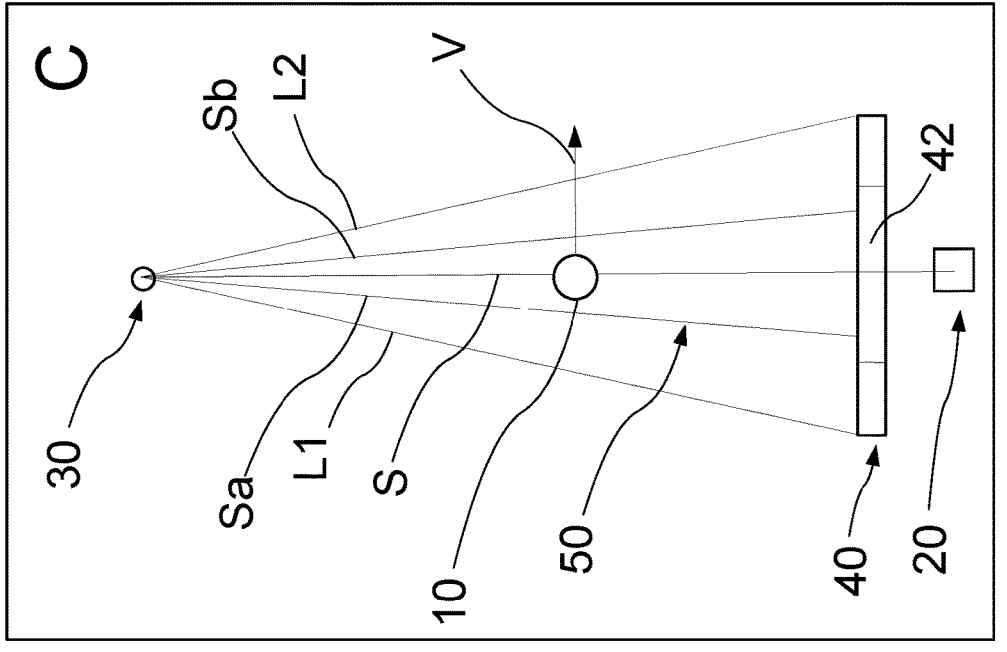
Figure 6E:
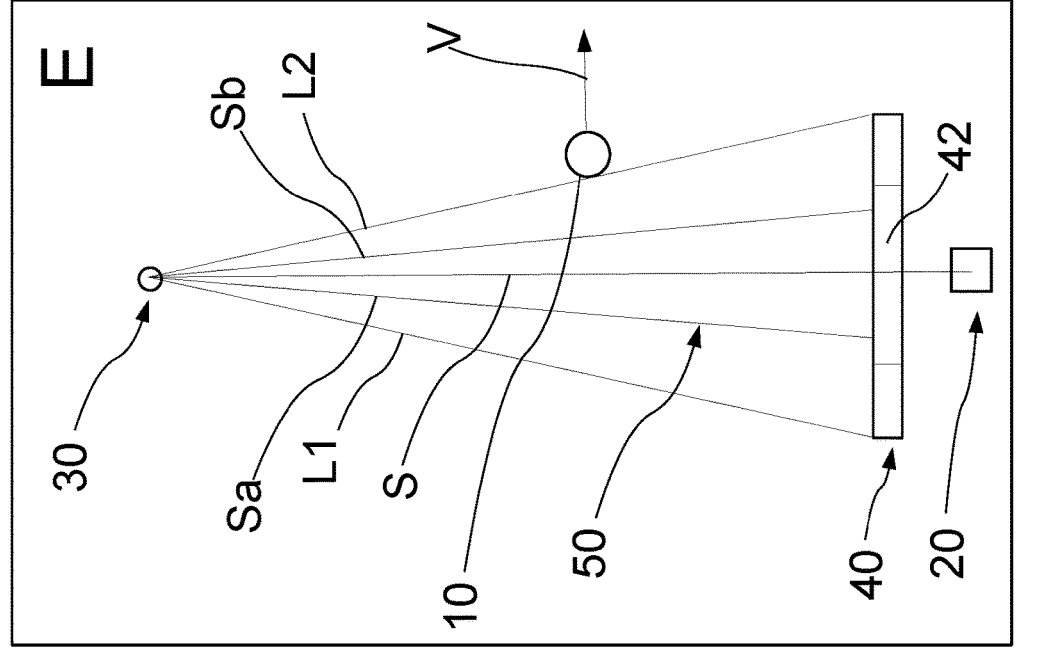
Figure 7:
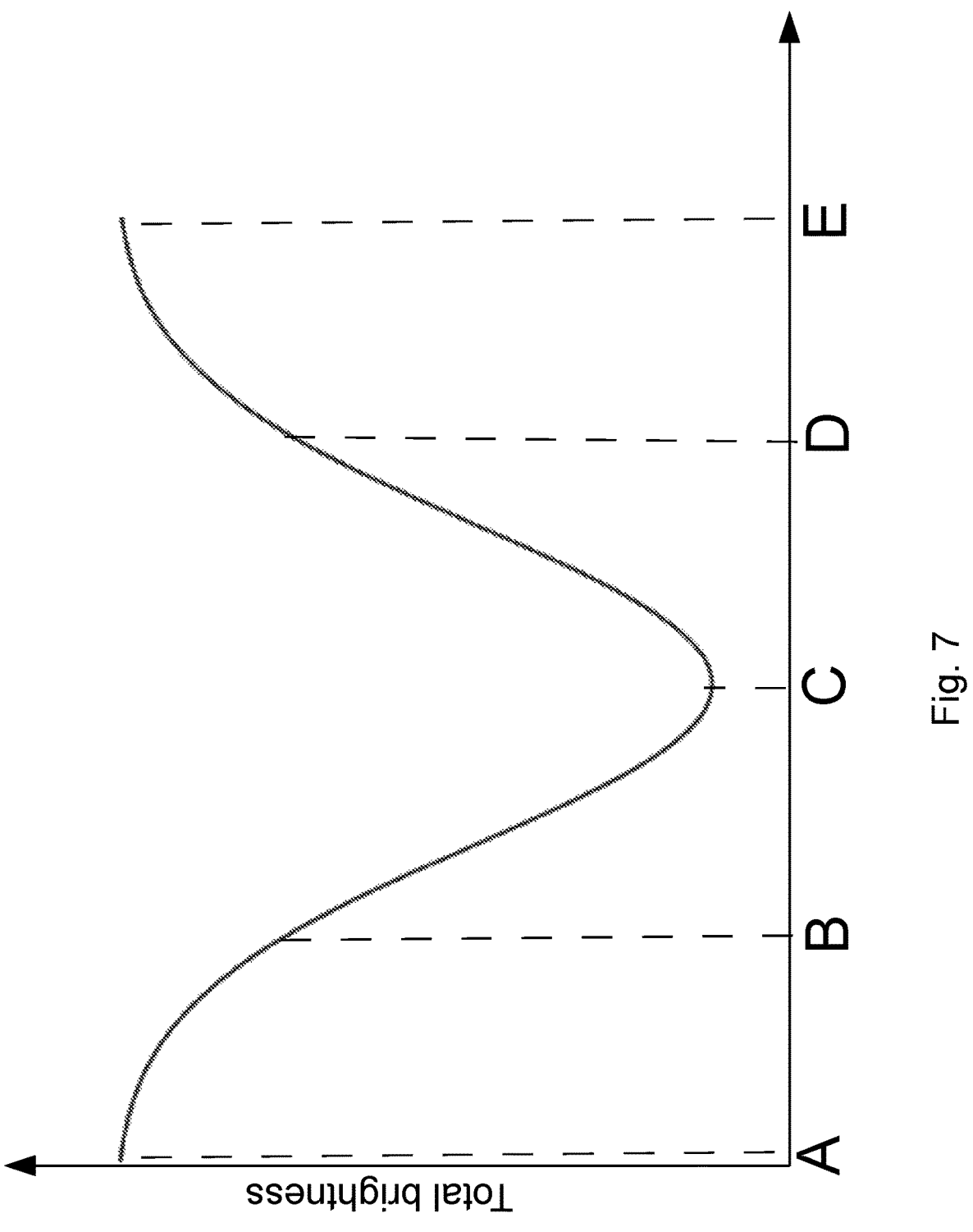

Further details of the invention will be explained with reference to the drawings. In the drawings FIG. 1 is a schematic view illustrating an exemplary embodiment of an optical gate according to the invention, FIG. 2a is a schematic side view illustrating a first position of the passage of a spherical projectile through the optical gate shown in FIG. 1, FIG. 2b is a schematic side view showing the position of the spherical projectile in the common plane determined by the illuminating array and sensor array of the optical gate shown in FIG. 1 at the crossing time, FIG. 2c is a schematic side view illustrating a third position of the passage of the spherical projectile through the optical gate shown in FIG. 1, FIG. 3 illustrates the total brightness that can be measured in the detection area in the positions of the spherical projectile shown in FIGS. 2a-2c, FIG. 4a is a schematic view illustrating the brightness distribution that can be measured along the detection area when a first point light source flashes in the position of the projectile shown in FIG. 2b, FIG. 4b is a schematic view illustrating the brightness distribution that can be measured along the detection area when a second point light source flashes in the position of the projectile shown in FIG. 2b, FIG. 4c is a schematic view illustrating the brightness distribution that can be measured along the detection area when a third point light source flashes in the position of the projectile shown in FIG. 2b, FIG. 4d is a schematic view illustrating the brightness distribution that can be measured along the detection area when a fourth point light source flashes in the position of the projectile shown in FIG. 2b, FIG. 5 is a schematic view illustrating the detection volume of an exemplary optical gate, FIG. 6a is a schematic side view illustrating the position of the spherical projectile just entering the detection volume and touching the first boundary plane delimiting the detection volume, FIG. 6b is a schematic side view illustrating the position of the spherical projectile crossing the first detection plane, FIG. 6c is a schematic side view illustrating the position of the spherical projectile crossing the common plane, FIG. 6d is a schematic side view illustrating the position of the spherical projectile crossing the second detection plane, FIG. 6e is a schematic side view illustrating the position of the spherical projectile just exiting the detection volume and touching the second boundary plane delimiting the measurement volume, FIG. 7 illustrates the total brightness that can be measured in the detection area in positions A-E of the spherical projectile shown in FIGS. 6a-6e.

FIG. 1 is a schematic illustration of an exemplary embodiment of an optical gate 100 according to the invention. The optical gate 100 is used to determine the velocity vector of a spherical projectile 10, i.e., the direction and magnitude of the velocity simultaneously. In the context of the present invention, spherical projectile 10 preferably refers to a body having a regular spherical shape, or a body whose shape deviates from a regular spherical shape only slightly from a practical point of view (regular polyhedra with a large number of faces, truncated polyhedra, etc.) as is known to the skilled person. In a preferred embodiment, the velocity of the projectile 10 is some couple of 10 m/s, possibly some couple of 100 m/s. The projectile 10 may be fired, for example, by compressed air or any other energy-containing medium, such as electricity, chemical reaction, mechanical energy (spring or flywheel), etc., as is known to the person skilled in the art. The projectile 10 may preferably be, for example, a projectile of plastic or metal, a few mm in diameter, commonly used in airsoft or airguns.

The optical gate 100 comprises a sensor array 20 defined by a row of light detecting sensors 22 arranged next to each other, and an illuminating array 30 defined by a row of point light sources 32 arranged next to each other and illuminating towards the sensors 22, wherein the illuminating array 30 is arranged opposite the sensor array 20. The sensor array 20 and the illuminating array 30 are arranged relative to each other such that the light emitted by any of the light sources 32 of the illuminating array 30 can be evaluated by all of the sensors 22 of the sensor array 20. In an exemplary embodiment, the light sources 32 are configured as LED light sources, preferably infrared LED light sources, thereby minimizing the disturbing effect of ambient light. It is noted that, where appropriate, the point light sources 32 may be implemented using other means, such as lasers, instead of LEDs, as is known to the skilled person. The sensors 22 of the light sensor array 20 are configured as sensors known per se (e.g., as light-sensing diodes) capable of detecting light emitted by the light sources 32, preferably for example infrared light, and having an output providing a voltage proportional to the light detected. In the exemplary embodiment shown in FIG. 1, the illuminating array 30 comprises four point light sources 32, in this case LEDs, arranged in a straight line, and the sensor array 20 comprises thirty-two sensors 22 (e.g. light-sensing diodes) arranged in a straight line, where the sensor array 20 and the illuminating array 30 are arranged along parallel straight lines. It is noted that the sensor array 20 and the illuminating array 30 may include a different number of sensors 22 and/or light sources 32 than those described above, as the case may be, and the sensors 22 and/or the light sources 32 may also be arranged along plane curves other than straight lines (e.g., arcs).

The sensor array 20 and the illuminating array 30 according to the invention are located in a common plane S, through which an optical diffuser plate 40 arranged between the illuminating array 30 and the sensor array 20 passes. In a preferred embodiment, the diffuser plate 40 is arranged closer to the sensor array 20 in such a way that its plane and the common plane S are perpendicular to each other (see FIG. 1). In the context of the present description, the diffuser plate 40 is understood to be an optical element that scatters the light passing through it, i.e. the shadow with a sharp contour projected on it appears on the other side of the diffuser plate 40 as a shadow without a sharp contour for the sensors 22, as is obvious to the expert. The diffuser plate 40 can be, for example, milk-glass known per se, etc. Each of the light detecting sensors 22 is capable of sensing a particular solid angle, and therefore the sensors 22 together define a detection area 42 running parallel to the sensor array 20 on the diffuser plate 40. In FIG. 5, it can be observed that an imaginary first and second planes L1, L2 connecting the sides of the detection area 42 parallel to the sensor array 20 with the illuminating array 30 and the detection area 42 delimit a detection volume 50. Based on simple optical considerations, it is easy to see that a shadow is projected on the detection area 42 by the light of the point light sources 32 only if at least a part of the body creating the shadow (e.g. the projectile 10) is within the measurement volume 50. That is, the sensors 22 can only detect the shadow created by the projectile 10 residing in the detection volume 50.

The optical gate 100 according to the invention comprises an electronic control unit 36 configured to consecutively flash point light sources 32 at predetermined time instants at high frequencies. In the context of the present description, by consecutive flashing of the light sources 32 of the illuminating array 30 means that at a given moment only one light source 32 lights up at the same time, after which the given light source 32 is switched off and another light source 32 is switched on (flashing), and so on. The time elapsed between consecutive flashes of the light sources 32 (e.g. two consecutive on-moments of the light sources 32) is of the order of a fraction of a second, preferably microsecond, i.e. the control unit 36 performs the consecutive flashes of the light sources 32 at high frequency. In a preferred embodiment, the frequency of the consecutive flashes in time is at least 1 MHz. It is noted that the flashing of the light sources 32 may not necessarily follow the physical order of the light sources 32 following each other in the illuminating array 30, but may follow any sequence. If all light sources 32 in the illuminating array 30 are lit in succession, the process starts over again, i.e. with the light sources 32 in the illuminating array 30 flashed earlier. The control unit 36 performs the flashing of the light sources 32 at a high frequency and at predetermined time instants, so that it can be determined which of the light sources 32 flashed at a given moment of time. The control unit 36 may be designed as a special circuit, for example, using a field programmable gate array (FPGA) as is known to the person skilled in the art.

The optical gate 100 according to the invention comprises an electronic measuring unit 26 for processing the signals generated by the light detecting sensors 22, the measuring unit 26 being configured to determine the brightness distribution and total brightness along the detection area 42 based on the signals generated by the sensors 22 of the sensor array 20 in response to the illumination of any point light source 32 of the illuminating array 30. By the measuring unit 26 is meant an electronic device that converts the analogue signal from the sensors 22 into a digital signal, processes it, preferably stores it and, if appropriate, transmits it to another electronic device as is known to the person skilled in the art. The measuring unit 26 may also be provided as a special circuit, for example by means of an FPGA inserted via an A/D converter. In a possible embodiment, the electronic control unit 36 and the electronic measuring unit 26 are configured as parts of a common IT unit 200, such as a computer. In a particularly preferred embodiment, the sensor array 20 comprises a plurality of sensor groups 24 formed by a plurality of sensors 22 arranged next to each other and aggregating signals from the respective sensors 22. This has the advantage that the sensitivity of the sensor group 24 is higher than the sensitivity of the individual sensors 22 forming the sensor group 24, thereby achieving a higher signal-to-noise ratio. Preferably, the signals from the sensors 22 of the sensor group 24 are aggregated before the analogue-to-digital conversion, i.e., before the signals are transmitted to the measuring unit 26, for example by means of a dedicated electronic element (not shown in the figures).

The total brightness along the detection area 42 is the sum of the signals measured by all sensors 22 of the sensor array 20 in the event of a particular light source 32 flashing. If there is no shadowing object (e.g. the projectile 10) in the detection volume 50, the total brightness measured for a given light source 32, in the absence of shadowing, shows a maximum value. As the projectile 10 enters the detection volume 50, the total brightness that can be measured when a given light source 32 flashes is reduced due to the shadow cast by the projectile 10 on the detection area 42. In FIG. 3, the change in the total brightness along the detection area 42 can be observed in the positions of the projectile 10 illustrated in FIGS. 2a-2c, in the event of a flash of a given light source 32. As can be seen, the total brightness that can be measured—in the case of any light source 32 flashing—will be at its minimum when the projectile 10 crosses the common plane S defined by the sensor array 20 and illuminating array 30, that is, when the centre of the spherical projectile 10 intersects the plane S. It should be noted that the maximum total brightness that can be measured in the detection area 42 for the different light sources 32 may be different, therefore it may be necessary to calibrate the maximum total brightness values for the different light sources 32.

FIGS. 4a-4d illustrate the brightness distributions that can be measured along the detection area 42 in the case of flashes of the different light sources 32. Note that in this exemplary embodiment, the frequency of the flashes falls in the MHz range, while the speed of the projectile 10 is a few times ten m/s, so that during the microsecond duration of the consecutive flashes of the four light sources 32, the projectile 10 is practically stationary. In FIG. 4a, it can be seen that the projectile 10 residing in the detection volume 50, when the light source 32a flashes, casts a shadow in the direction of the line connecting the projectile 10 with the given light source 32a on the detection area 42, which is detected by the sensors 22 located under the cast shadow. In FIGS. 4b-4d, it can be observed respectively that when the light sources 32b-32d flash, the shadow of the projectile 10 appears in different areas of the detection area 42, that is, the brightness distribution changes for each light source 32, so that the different shadows are detected by different sensors 22 of the sensor array 20. Note that the sensors 22 in the sensor array 20 are arranged at such a distance from each other that the shadow of the projectile 10 residing in the detection volume 50 is detected by at least two adjacent sensors 22. Due to the point-like nature of the light sources 32, the shadow projected onto the detection area 42 has a sharp contour (umbra), but due to the effect of the diffuser plate 40, the sensors 22 will measure a Gaussian curve-like continuous brightness distribution. The centre of the shadow cast by the projectile 10 can be determined based on the data of the sensors 22.

The invention also relates to a method for determining the velocity vector V of a spherical projectile 10 using the optical gate 100 according to the invention. In the following, the operation of the optical gate 100 will be described together with the method according to the invention.

During the method, in the measurement volume 50, a first imaginary detection plane Sa is defined connecting a first baseline 45a of the detection area 42 parallel to the sensor array 20 with the illuminating array 30, and a second imaginary detection plane Sb is defined connecting a second baseline 45b of the detection area 42 parallel to the sensor array 20 with the illuminating array 30. The imaginary detection planes Sa, Sb are selected planes whose baselines 45a, 45b are marked at predetermined positions; for example, the baselines 45a, 45b pass through the quarter points of the width of the detection area 42, as observed in FIG. 5. Of course, the measurement planes Sa, Sb may be taken in other positions, for example, at least one of the measurement planes Sa, Sb may be the boundary plane L1, L2 or the plane S.

In the next step, spherical projectile 10 is passed through the detection planes Sa, Sb, during which the point light sources 32 of the illuminating array 30 are flashed consecutively with a high frequency using the control unit 36. The consecutive flashing of the light sources 32 is preferably carried out at least until the projectile 10 is in the detection volume 50. The projectile 10 may preferably be, for example, the projectile 10 used for the projectile modal analysis presented above. During the consecutive flashes of the light sources 32, the brightness distribution and the total brightness along the detection area 42 are determined in the case of the flashing of each point light source 32 using the sensors 22 of the sensor array 20 and the measuring unit 26, as described previously. In FIG. 7, the change in the total brightness along the detection area 42 can be observed in the positions A-E of the projectile 10 illustrated in FIGS. 6a-6e, in the event of the flash of a given light source 32. In FIG. 6a, the projectile 10 is just entering the detection volume 50, that is, the projectile 10 touches the first boundary plane L1 for the first time. It can be seen in FIG. 7 (position A) that the total brightness that can be measured when a given light source 32 flashes starts to decrease from the maximum value. Similarly, in FIG. 6e, it can be seen how the projectile 10 is just leaving the detection volume 50, so the projectile 10 touches the second boundary plane L2 from the outside. It can be seen in FIG. 7 (E-position) that the total brightness that can be measured when a given light source 32 flashes is just returning to its maximum value. In other words, based on the time curve of the total brightness, the moments of entry and exit of the projectile 10 into and out of the detection volume 50 can be determined. We note that the total brightness can only be actually measured when one of the light source 32 flashes, therefore the time curve of the total brightness is given by the discrete values associated with each flash. However, since the frequency of flashes is high, between two flashes the projectile 10 does not move significantly for the purpose of measurement. However, in a preferred embodiment, for example in the case of a projectile 10 with a higher velocity, a continuous curve can be fitted to the measurement points of the total brightness by interpolation, from which the total brightness can be read at any time, i.e. for example the exact time of arrival of the projectile 10 at detection volume 50 and its departure from measurement volume 50, or the exact time of crossing a given measurement plane.

In the next step of the method, given the arrival and departure times and the size of the spherical projectile 10, crossing times corresponding to the intersections of the projectile 10 on the first and second detection planes Sa, Sb are determined. In the context of the present description, the crossing times are defined as the time instants when a predefined part of the projectile 10, e.g. the centre, is in the given detection plane Sa, Sb. Since the position of the detection plane Sa, Sb is known, assuming that the projectile 10 has passed through the detection volume 50 at a constant velocity, it is easy to calculate the time instants when the centre of the projectile was on the detection plane Sa, Sb.

In the next step, for each of the detection planes Sa, Sb, the brightness distribution along the detection area 42 is determined for a plurality of the point light sources 32 of the illuminating array 30 in the case of the flashing of the given light source 32 at the crossing time. As previously described, due to the high frequency flashes of the light sources 32, the light sources 32a-32d of the illuminating array 30 are essentially flash during the crossing time, producing the brightness distributions shown in FIGS. 4a-4d. However, in a preferred embodiment, for example in the case of a projectile 10 with a higher velocity, in order to increase the measurement accuracy, the brightness distributions along the detection area 42 for flashes of the light sources 32a-32d taken exactly at the crossing time are determined by interpolating the brightness distributions measured at time instants slightly different from the crossing time, for example by the curve fitting mentioned above, as is apparent to the skilled person.

By combining the brightness distributions of the projectile 10 for the different light sources 32a-32d, the position of the projectile 10 in the given detection plane Sa, Sb at the crossing time is determined. This can be done, for example, by measuring the brightness distributions for each light source 32 at several known positions of the projectile 10 crossing the detection plane Sa, Sb prior to the method, and then using these to create a correlation database for the different positions, which associates the different brightness distributions for each light source 32 with the different positions of the projectile 10 crossing the detection plane Sa, Sb. Based on the measured brightness distributions, using the correlation databases prepared for the detection plane Sa, Sb, the position of the projectile 10 on the detection plane Sa, Sb is obtained. Finally, the resulting positions and crossing times are used to determine the velocity vector V of the projectile 10.

The invention also relates to a further method for determining the velocity vector V of a spherical projectile 10 using at least two optical gates 100 arranged in series according to the invention. A first optical gate 100 is provided having a first illuminating array 30, a first sensor array 20 and a first common plane S defined by the first illuminating array 30 and the first sensor array 20, and a second optical gate 100 is provided having a second illuminating array 30, a second sensor array 20 and a second common plane S defined by the second illuminating array 30 and the second sensor array 20, the first and second optical gates 100 are arranged in series such that a projectile 10 travelling substantially straight can pass through the planes S of the optical gates 100 in succession.

During the method, the point light sources 32 of the first illuminating array 30 are flashed one after the other, while determining the brightness distribution and total brightness along the first detection area 42 of the first optical gate 100 for each point light source 32 of the first illuminating array 30 as described above, and then determining a first crossing time corresponding to the minimum of the measured total brightness. The total brightness measured in the first detection area 42 for any light source 32 in the first illuminating array 30 will be at its minimum when the projectile 10 crosses the first common plane S defined by the first illuminating array 30 and the first sensor array 20, since the projectile 10 will cast its largest shadow on the sensors 22 of the first sensor array 20.

In the next step of the method, determining the brightness distributions that can be measured along the first detection area 42 in the case of the flashes of the light sources 32 of the first illuminating array 30 at the first crossing time, and determining the position of the projectile 10 in the first common plane S at the first crossing time by combining the brightness distributions thus determined for the different light sources 32. This position can be determined, for example, by finding the centres of the shadows of the projectile 10 generated by the flash of each light source 32 and connecting them with the respective point source 32. The resulting lines intersect at the centre of the projectile 10, i.e. the position of the projectile 10 in the first common plane S can be determined. In another possible embodiment, the position of the projectile 10 in the first common plane S is determined from the correlation database mentioned earlier. In this case, correlation measurements should be performed on the first common S-plane.

After passing through the first common plane S, the projectile 10 continues towards the second optical gate 100. In the method, the steps described above are also performed for the second optical gate 100, i.e., determining the brightness distributions and the total brightness that can be measured along the second detection area 42 in the case of the flashes of the light sources 32 of the second illuminating array 30. Then, a second crossing time is determined as described above, corresponding to the minimum of the measured total brightness, and for several point light sources 32 of the second illuminating array 30, the brightness distribution measurable along the second detection area 42 is determined in the case of a flash of the given light source 32 at the second crossing time instant, then, by combining the brightness distributions associated with the different light sources 32 determined in this way, the position of the projectile 10 in the second common plane S at the second crossing time instant is determined. As a result, we know the two positions of the projectile 10 at two time instants, so that we can determine the velocity vector V of the projectile 10 based on the positions and crossing times obtained for the first and second common planes S. As described for the first method, for the sake of greater accuracy, the total brightness associated with the crossing time in a given common plane S can be determined by interpolating the total brightness measured in a given detection area 42, or the brightness distributions that can be measured along the given detection band 42, in the case of the flashes of the light sources 32 of the given illuminating array 30 taken at the crossing time belonging to the given common S plane, can also be produced by interpolation of the measured brightness distributions.

It will be apparent to those skilled in the art that alternative solutions to the other embodiments shown herein are contemplated but are within the scope of the appended claims.

The invention claimed is:

1. The optical gate for determining a velocity vector of a spherical projectile, comprises
 a sensor array defined by a row of light detecting sensors arranged next to each other, and
 an illuminating array defined by a row of point light sources arranged next to each other and illuminating towards the sensors,
 wherein the illuminating array is arranged opposite the sensor array,
 said illuminating array and said sensor array being arranged in a common plane, and
 an optical diffuser plate being arranged between said illuminating array and said sensor array,
 said light detecting sensors defining a detection area on said diffuser plate parallel to said sensor array, and
 the optical gate further comprises
 an electronic control unit configured to consecutively flash the point light sources at predetermined time instants at high frequency, and
 an electronic measuring unit for processing the signals generated by the light detecting sensors, said measuring unit being configured to determine the brightness distribution and total brightness along the detection area based on the data generated by the sensors of the sensor array.

2. The optical gate according to claim 1, wherein the plane of the diffuser plate and the common plane are perpendicular to each other.

3. The optical gate according to claim 1, wherein the electronic control unit and the electronic measuring unit are configured as part of a common IT unit.

4. The optical gate according to claim 1, wherein the sensor array comprises a plurality of sensor groups formed by adjacent sensors and aggregating signals from the sensors.

5. The optical gate according to claim 1, wherein the point light sources are configured as LED light sources.

6. The optical gate according to claim 1, wherein the sensor array and the illuminating array are arranged along parallel lines.

7. A method for determining a velocity vector of a spherical projectile using an optical gate, the method comprising:
 providing a detection volume bounded by the detection area and by first and second boundary planes;
 connecting the sides of the detection area parallel to the sensor array with the illuminating array, in the measurement volume,
 defining a first detection plane connecting a first baseline of the detection area parallel to the sensor array with the illuminating array,
 defining a second detection plane connecting a second baseline of the detection area parallel to the sensor array with the illuminating array, and
 passing a spherical projectile through the detection planes, the method further comprising:
 flashing the point light sources of the illuminating array consecutively by means of the control unit, while determining the brightness distribution and the total brightness along the detection area for each flash of the point light sources by means of the sensors of the sensor array and the measuring unit,
 based on the measured total brightness, determining the time instants of arrival of the projectile at the detection volume and of its departure from the detection volume,
 given the arrival and departure times and the size of the spherical projectile, determining crossing times corresponding to the intersections of the projectile on the first and second detection planes, and
 for each of the detection planes:
 for a plurality of point light sources of the illuminating array, determining the brightness distribution measured along the detection area in the case of a flash of a given light source at the crossing time,
 determining the position of the projectile in the given detection plane at the crossing time by combining the brightness distributions thus determined for the different light sources, and
 determining the velocity vector of the projectile based on the positions and crossing times obtained.

8. The method according to claim 7, further comprising at least one of the detection planes is selected as a plane connecting a side of the detection area parallel to the sensor array with the illuminating array, or as a common plane connecting the illuminating array to the sensor array.

9. The method according to claim 7, further comprising determining the total brightness associated with the time instants of arrival of the projectile at the detection volume and departure of the projectile from the detection volume by interpolating the measured total brightness.

10. The method according to claim 7, further comprising determining the total brightness measured at the crossing time corresponding to the intersection of the given detection plane by interpolating the measured total brightness.

11. The method according to claim 7, further comprising determining the brightness distributions measured along the detection area in the case of a flash of a given light source at the crossing time corresponding to the given detection plane, by interpolating the measured brightness distributions.

12. The method according to claim 7, further comprising the point light sources have a flashing frequency of at least 1 MHz.

13. A method for determining a velocity vector of a spherical projectile, comprising at least two optical gates arranged in series, of which a first optical gate comprises a first illuminating array, a first sensor array and a first common plane defined by the first illuminating array and the first sensor array, and a second optical gate comprises a second illuminating array, a second sensor array and a second common plane defined by the second illuminating array and the second sensor array, passing a spherical projectile through the first and second common planes, the method further comprising:

flashing the point light sources of the first illuminating array consecutively while determining, for each flash of the point light sources, the brightness distribution and the total brightness along the first detection area of the first optical gate, determining a first crossing time corresponding to the minimum of the measured total brightness, for a plurality of point light sources of the first illuminating array, determining the brightness distribution measured along the first detection area in the case of a flash of a given light source at the first crossing time, and determining the position of the projectile in the first common plane at the first crossing time by combining the brightness distributions determined for the different light sources, flashing the point light sources of the second illuminating array consecutively while determining, for each flash of the point light sources, the brightness distribution and the total brightness along the second detection area of the second optical gate, determining a second crossing time corresponding to the minimum of the measured total brightness, for a plurality of point light sources of the second illuminating array, determining the brightness distribution measured along the second detection area in the case of a flash of a given light source at the second crossing time, and determining the position of the projectile in the second common plane at the second crossing time by combining the brightness distributions thus determined for the different light sources, and determining the velocity vector of the projectile based on the positions and crossing times obtained for the first and second common planes.

14. The method according to claim 13, further comprising determining the total brightness at the crossing time of a given common plane by interpolating the total brightness measured in the given detection area.

15. The method according to claim 13, further comprising determining the brightness distributions measured along a given detection area in the case of a flash of a given light source at the crossing time corresponding to the given common plane, by interpolating the measured brightness distributions.

16. The method according to claim 13, further comprising the point light sources of the first and second illuminating arrays have a consecutive flashing frequency of at least 1 MHz.

17. The optical gate according to claim 5, wherein the LED light sources are infrared LED light sources.

* * * * *